US011464063B2

(12) United States Patent
Li et al.

(10) Patent No.: US 11,464,063 B2
(45) Date of Patent: Oct. 4, 2022

(54) METHOD, APPARATUS, AND SYSTEM FOR ESTABLISHING CONNECTION

(71) Applicant: HUAWEI TECHNOLOGIES CO., LTD., Shenzhen (CN)

(72) Inventors: Bingzhao Li, Beijing (CN); Wei Quan, Beijing (CN); Xuelong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 16/734,923

(22) Filed: Jan. 6, 2020

(65) Prior Publication Data
US 2020/0146089 A1    May 7, 2020

Related U.S. Application Data

(63) Continuation of application No. PCT/CN2018/087903, filed on May 22, 2018.

(30) Foreign Application Priority Data

Jul. 11, 2017    (CN) .......................... 201710562453.7

(51) Int. Cl.
*H04W 76/19*    (2018.01)
*H04W 76/18*    (2018.01)
(Continued)

(52) U.S. Cl.
CPC ....... *H04W 76/19* (2018.02); *H04W 36/0033* (2013.01); *H04W 36/0069* (2018.08);
(Continued)

(58) Field of Classification Search
CPC ..... H04W 76/19; H04W 76/18; H04W 76/28; H04W 76/27; H04W 36/0069;
(Continued)

(56) References Cited

U.S. PATENT DOCUMENTS

2013/0039339 A1    2/2013  Rayavarapu et al.
2015/0146599 A1*   5/2015  Jha .................. H04L 1/0026
                                                    370/311
(Continued)

FOREIGN PATENT DOCUMENTS

CN    103858512 A    6/2014
CN    104219738 A    12/2014
(Continued)

OTHER PUBLICATIONS

Nokia et al., "Discussion on latencies in NR," 3GPP TSG-RAN WGR Meeting #81 R4-1609331, Reno, USA, Nov. 14-18, 2016, pp. 1-7 (Year: 2016).*

(Continued)

*Primary Examiner* — Un C Cho
*Assistant Examiner* — Lalita W Pace
(74) *Attorney, Agent, or Firm* — Rimon PC

(57) ABSTRACT

The present application discloses methods and apparatus for resuming a radio access network (RAN) connection by an inactive terminal device. An example method disclosed herein includes the step of sending, by a terminal device, connection resumption request information to a first RAN element, where the first RAN element corresponds to the cell on which the terminal device currently camps and is a RAN element indicated by configuration information of a master cell used by the terminal device when in a connected state. The terminal device receives acknowledgement information sent by the first RAN element and resumes a connection to a second RAN element based on the acknowledgement information, where the second RAN element is a RAN element indicated by the configuration information of the secondary cell.

14 Claims, 8 Drawing Sheets

(51) Int. Cl.
  *H04W 76/28* (2018.01)
  *H04W 76/27* (2018.01)
  *H04W 36/00* (2009.01)
  *H04W 36/08* (2009.01)
(52) U.S. Cl.
  CPC ........... *H04W 36/08* (2013.01); *H04W 76/18* (2018.02); *H04W 76/27* (2018.02); *H04W 76/28* (2018.02)
(58) Field of Classification Search
  CPC . H04W 36/0033; H04W 36/08; H04W 24/10; H04W 76/15; H04L 5/001; H04L 5/0098
  See application file for complete search history.

(56) References Cited

U.S. PATENT DOCUMENTS

| | | | |
|---|---|---|---|
| 2015/0223282 A1* | 8/2015 | Vajapeyam | H04W 76/19 370/221 |
| 2015/0271713 A1 | 9/2015 | Kim et al. | |
| 2016/0198439 A1* | 7/2016 | Dalsgaard | H04L 5/001 370/329 |
| 2016/0330680 A1 | 11/2016 | Yi et al. | |
| 2017/0019945 A1* | 1/2017 | Chiba | H04W 76/15 |
| 2017/0048918 A1 | 2/2017 | Iwamura et al. | |
| 2018/0220483 A1* | 8/2018 | Hayashi | H04W 76/15 |
| 2019/0045564 A1* | 2/2019 | Hayashi | H04W 76/30 |
| 2019/0174366 A1* | 6/2019 | Susitaival | H04W 36/0033 |
| 2019/0274071 A1* | 9/2019 | Keskitalo | H04L 29/08 |
| 2020/0169922 A1* | 5/2020 | Ozturk | H04W 76/27 |
| 2020/0235890 A1* | 7/2020 | Martin | H04L 5/0053 |
| 2021/0126747 A1* | 4/2021 | Kim | H04W 74/0833 |
| 2021/0204355 A1* | 7/2021 | Teyeb | H04L 5/0098 |

FOREIGN PATENT DOCUMENTS

| | | | | |
|---|---|---|---|---|
| CN | 104219787 A | 12/2014 | | |
| CN | 105900521 A | 8/2016 | | |
| CN | 106068658 A | 11/2016 | | |
| CN | 106465279 A | 2/2017 | | |
| EP | 2922364 A1 * | 9/2015 | ............ | H04W 76/15 |
| WO | 2018083369 A1 | 5/2018 | | |
| WO | 2018174791 A1 | 9/2018 | | |

OTHER PUBLICATIONS

Qualcomm Incorporated:"RRC Inactive with MR oc",3GPP Draft; R3-172430,Jun. 26, 2017 (Jun. 26, 2017), XP051302372,total 6 pages.

Ericsson: "RRC suspend/resume in LTE-NR tight interworking",3GPP Draft; R2-1706634,Jun. 26, 2017 (Jun. 26, 2017), XP051301136,total 4 pages.

3GPP TS 37.340 V0.2.0 (Jun. 2017);3rd Generation Partnership Project;Technical Specification Group Radio Access Network;Evolved Universal Terrestrial Radio Access (E-UTRA) and NR;Multi-connectivity;Stage 2(Release 15);total 43 pages.

3GPP TS 38.331 V0.0.4 (Jun. 2017);3rd Generation Partnership Project;Technical Specification Group Radio Access Network; NR;Radio Resource Control (RRC);Protocol specification(Release 15 );total 22 pages.

Qualcomm Incorporated,"MR-DC Mode in Inactive",3GPP TSG-RAN WG2 Meeting NR ad-hoc 2 R2-1706892, Qingdao, China, Jun. 27-29, 2017,total 6 pages.

Ericsson,"Suspend/resume in LTE-NR interworking scenarios",3GPP TSG-RAN WG2 #98 Tdoc R2-1704425, Hangzhou, P.R. of China, May 15-19, 2017 (Resubmission of R2-1702704),total 3 pages.

* cited by examiner

METHOD, APPARATUS, AND SYSTEM FOR ESTABLISHING CONNECTION

CROSS-REFERENCE TO RELATED APPLICATIONS

This application is a continuation of International Application No. PCT/CN2018/087903, filed on May 22, 2018, which claims priority to Chinese Patent Application No. 201710562453.7, filed on Jul. 11, 2017. The disclosures of the aforementioned applications are hereby incorporated by reference in their entireties.

TECHNICAL FIELD

This application relates to the field of communications technologies, and in particular, to a method, an apparatus, and a system for establishing a radio access connection.

BACKGROUND

Because bandwidth resources and coverage of a single base station are limited, radio resources of a plurality of cells or base stations are centralized to provide services for a user, so that the capacity requirement and the coverage requirement of the user can be more easily satisfied. This approach is generally referred to as multi-connectivity, for example, dual-connectivity. In a dual-connectivity mode, one terminal device may be connected to two radio access network (RAN) elements at the same time, and perform data transmission using both elements. One RAN element may be designated as a master RAN element, and the cell included in the master RAN element is a master cell group (MCG). The master RAN element controls generation of a security parameter of the terminal device, and maintains a control plane connection between the master RAN element and a core network. The other RAN element is a secondary RAN element, and the cell included in the secondary RAN element is a secondary cell group (SCG). The master RAN element may independently transmit user plane data. The secondary RAN element may also independently transmit user plane data, and the master RAN element and the secondary RAN element may share transmission of user plane data. It should be noted that there is no control plane connection between the secondary RAN element and the core network, and a data plane connection is an optional connection. As shown in FIG. 1, a terminal device 10 performs data transmission with a core network device 12 through a RAN 11 and a RAN 12, where the RAN 11 is a master RAN element, and the RAN 12 is a secondary RAN element.

Currently, if the terminal device in the dual-connectivity mode has no data to transmit within a particular time, the master RAN element sends a suspension indication to the terminal device, to control the terminal device to enter an inactive state from a connected state and release a connection between the terminal device and the secondary RAN element. If the terminal device later has data to transmit, the terminal device needs to resume the connection to the RAN element. Specifically, the terminal device needs to send a connection resumption request to a cell that is currently camped on. In this case, the current cell is used as a master cell, and a RAN element corresponding to the cell that is currently camped on is used as a new master RAN element to establish a new connection for the terminal device. After the new connection is established, the master RAN element configures measurement information for the terminal device to allow the terminal device to perform measurement. After the terminal device feeds back a measurement result to the master RAN element, the master RAN element selects a new secondary RAN element for the terminal device based on the measurement result, and adds configuration information of a new SCG for the terminal device. The terminal device establishes a connection to the new secondary RAN element based on the configuration information, and can then transmit data with the core network device. It can be learned that steps of resuming a connection to the secondary RAN element by the terminal device are complex, and consequently, the amount of signaling is large, and the delay is long, resulting in low network transmission efficiency.

SUMMARY

Embodiments of this application provide a method, an apparatus, and a system for establishing a network connection and for solving the problem of low network transmission efficiency because the steps of resuming a connection to a secondary RAN element by a terminal device in an inactive state are complex and have long delay.

To achieve the foregoing objectives, the following technical solutions are used in the embodiments of this application.

According to a first aspect, a method for establishing a connection is provided. The method includes: sending, by a terminal device, connection resumption request information to a first radio access network (RAN) element, where the first RAN element is a RAN element corresponding to a cell on which the terminal device currently camps, and the first RAN element is a RAN element indicated by configuration information of a master cell used by the terminal device when the terminal device was in a connected state. The terminal device is in an inactive state. The terminal device stores configuration information, and the configuration information includes configuration information of a secondary cell used by the terminal device when in the connected state. The terminal device receives acknowledgement information sent by the first RAN element, where the acknowledgement information is in response to the connection resumption request information. The terminal device resumes a connection to a second RAN element based on the acknowledgement information, where the second RAN element is a RAN element indicated by the configuration information of the secondary cell.

The connection resumption request information is used by the terminal device to enter the connected state again from the inactive state. This process may also be referred to as connection resumption, activation, or reactivation. The connection resumption request information may be carried in a message such as a connection resumption request, a connection activation request, or a connection reactivation request. The configuration information of the secondary cell includes an identifier, frequency information, or the like of the secondary cell, and may be used to connect to the secondary RAN element by the terminal device. The secondary cell may be a carrier aggregation secondary cell, or may be a secondary cell in an MCG in dual-connectivity, a main secondary cell in an SCG, or another secondary cell.

It can be learned that in this embodiment of this application, when determining that data needs to be transmitted, the terminal device may resume a connection to an original RAN element based on the configuration information. In this way, the steps of resuming the connection by the terminal device are simplified, the process of resuming the connection by the terminal device is accelerated, and network transmission efficiency is improved.

In a possible design, if the received acknowledgement information sent by the first RAN element includes information for instructing the terminal device to maintain a configuration of the secondary cell, the terminal device determines to resume the connection to the second RAN element. If the received acknowledgement information, sent by the first RAN element, for the connection resumption request information does not include information for instructing the terminal device to maintain a configuration of the secondary cell, the terminal device determines, based on the stored configuration information of the master cell, whether the first RAN element is a master cell used by the terminal device in the connected state; and if yes, the terminal device can also determine to resume the connection to the second RAN element. Therefore, two implementations for the received acknowledgement information, sent by the first RAN element, for the connection resumption request information are provided.

In a possible design, the terminal device measures the at least one cell in the one or more secondary cells after the terminal device determines that the terminal device needs to send the connection resumption request information to the first RAN element and that, based on the configuration information of the master cell, the cell on which the terminal device currently camps and the master cell are the same cell, and can preferentially measure the main secondary cell. This is because there is a higher probability that the terminal device can successfully resume a connection to the secondary cell used by the terminal device in the connected state if the master cell used by the terminal device in the connected state requests to resume a connection. Therefore, a process of resuming the connection to the secondary cell used by the terminal device in the connected state can be accelerated when the secondary cell used by the terminal device in the connected state is measured in advance.

In a possible design, the terminal device resumes the connection to the second RAN element based on the configuration information of the secondary cell if the terminal device determines that the at least one cell in the one or more secondary cells is available; or the terminal device sends information about a connection resumption failure to the first RAN element if the terminal device determines that the at least one cell in the one or more secondary cells is unavailable.

In a possible design, if the terminal device detects the at least one cell in the one more secondary cells used by the terminal device in the connected state, the terminal device determines that the secondary cell used by the terminal device in the connected state is available. If the terminal device does not detect the at least one cell in the one or more secondary cells, the terminal device determines that the secondary cell used by the terminal device in the connected state is unavailable.

Alternatively, if the terminal device detects the at least one cell in one or more secondary cells used by the terminal device in the connected state and a signal measurement value of the detected cell is greater than or equal to a threshold, the terminal device determines that the secondary cell used by the terminal device in the connected state is available. If the terminal device detects the at least one cell in the one or more secondary cells used by the terminal device in the connected state but a signal measurement value of the detected cell is less than a threshold, the terminal device determines that the secondary cell used by the terminal device in the connected state is unavailable.

The threshold may be a predefined value, or may be a value dynamically configured by the first RAN element based on a network status or a service type of the terminal device. Alternatively, the threshold may be carried in a connection suspension indication sent by the first RAN element, or may be carried in an acknowledgment message sent by the first RAN element to the terminal device.

According to a second aspect, a method for establishing a connection is provided. The method includes: receiving, by a first radio access network RAN element, connection resumption request information sent by a terminal device, where the connection resumption request information includes an identifier of the terminal device; obtaining, by the first RAN element based on the identifier of the terminal device, configuration information of a secondary cell used by the terminal device in a connected state; and sending, by the first RAN element, acknowledgement information to the terminal device, where the acknowledgement information is in response to the connection resumption request information and is used to instruct the terminal device to resume a connection to a second RAN element, and where the second RAN element is a RAN element indicated by the configuration information of the secondary cell.

In a possible design, the acknowledgement information further includes information for instructing the terminal device to maintain a configuration of the secondary cell.

In a possible design, the first RAN element receives activation indication information sent by the second RAN element, where the activation indication information is used to notify the terminal device that the connection to the second RAN element has been resumed.

In a possible design, before the first RAN element receives the connection resumption request information sent by the terminal device, if the first RAN element determines that the terminal device has no data to transmit within a preset time period, the first RAN element instructs the terminal device to enter an inactive state.

In a possible design, the first RAN element sends inactive time configuration information to the second RAN element, where the inactive time configuration information is used to instruct the second RAN element to report a state notification of the terminal device within the preset time period. The state notification of the terminal device is used to notify the first RAN element of a data transmission status of the terminal device within the preset time period. The state notification of the terminal device includes at least one of an active state notification and an inactive state notification. In this case, the first RAN element determines, based on the state notification of the terminal device reported by the second RAN element, that the terminal device has no data to transmit within the preset time period.

If the first RAN element receives the active state notification of the terminal device reported by the second RAN element, the first RAN element determines that the terminal device has data to transmit within the preset time period. If the first RAN element receives the inactive state notification reported by the second RAN element, the first RAN element further determines, based on a data transmission status of the first RAN element, whether the terminal device has no data to transmit within the preset time period.

The inactive time configuration information includes a length of a specified time period, and/or a period of reporting an inactive state notification, and/or a quantity of times of reporting the inactive state notification.

According to a third aspect, a method for establishing a connection is provided. The method includes: obtaining, by a terminal device, measurement configuration information, and determining a to-be-measured object based on information about a cell on which the terminal device currently camps, where the terminal device is in an inactive state in this case; performing, by the terminal device, cell measurement on the to-be-measured object, and sending a cell measurement result to a first RAN element, where the first RAN element is a RAN element corresponding to the cell on which the terminal device currently camps; receiving, by the terminal device, configuration information of a secondary cell sent by the first RAN element; and establishing, by the terminal device, a connection to a second RAN element based on the configuration information of the secondary cell, where the configuration information of the secondary cell is determined by the first RAN element based on the cell measurement result, and the second RAN element is a RAN element indicated by the configuration information of the secondary cell.

It can be learned that the terminal device in the inactive state can determine the to-be-measured object based on the cell that is currently camped on, and perform cell measurement on the to-be-measured object in advance. Then, the RAN element corresponding to the cell that is currently camped on can determine the configuration information of the secondary cell for the terminal device based on the cell measurement result. In this way, acceleration of the process of resuming the connection by the terminal device and improvement of network transmission efficiency are facilitated.

In a possible design, the terminal device receives the measurement configuration information sent by a third RAN element, where the third RAN element is a RAN element at which the terminal device is located when the terminal device enters the inactive state from a connected state, and the measurement configuration information includes information about the cell that is camped on, information about a measurement object, and a mapping relationship between the cell that is camped on and the measurement object.

In a possible design, the terminal device receives a system message sent by the cell that is currently camped on, where the system message includes the measurement configuration information, and the measurement configuration information includes information about a measurement object.

According to a fourth aspect, a method for establishing a connection is provided. The method includes: receiving, by a first radio access network RAN element, a cell measurement result for a to-be-measured object that is sent by a terminal device, where the to-be-measured object is determined by the terminal device based on a cell that is currently camped on, and the first RAN element is a RAN element corresponding to the cell on which the terminal device currently camps; and sending, by the first RAN element, configuration information of a secondary cell to the terminal device, where the configuration information of the secondary cell is determined by the first RAN element based on the cell measurement result.

In a possible design, the first RAN element sends a system message, where the system message includes information about a measurement object, so that the terminal device determines the to-be-measured object.

According to a fifth aspect, a terminal device for establishing a connection is provided. The terminal device includes:
a sending unit, configured to send connection resumption request information to a first radio access network RAN element, where the first RAN element is a RAN element corresponding to a cell on which the terminal device currently camps, the first RAN element is a RAN element indicated by configuration information of a master cell used by the terminal device when in a connected state, the terminal device is now in an inactive (inactive) state, the terminal device stores configuration information by using a storage unit, and the configuration information includes configuration information of a secondary cell used by the terminal device when in the connected state; a receiving unit, configured to receive acknowledgement information sent by the first RAN element, where the acknowledgement information is in response to the connection resumption request information; and a processing unit, configured to resume a connection to a second RAN element based on the acknowledgement information, where the second RAN element is a RAN element indicated by the configuration information of the secondary cell.

In a possible design, the processing unit is further configured to: if the acknowledgement information includes information for instructing the terminal device to maintain a configuration of the secondary cell, determine to resume the connection to the second RAN element.

In a possible design, the processing unit is further configured to determine to resume the connection to the second RAN element if the terminal device determines, based on the configuration information of the master cell, that the cell on which the terminal device currently camps and the master cell are the same cell.

In a possible design, the processing unit is further configured to measure at least one cell in the one or more secondary cells after the terminal device determines that the terminal device needs to send the connection resumption request information to the first RAN element and the terminal device determines, based on the configuration information of the master cell, that the cell on which the terminal device currently camps and the master cell are the same cell.

In a possible design, the processing unit is further configured to resume the connection to the second RAN element based on the configuration information of the secondary cell that is stored in the storage unit if the terminal device determines that the at least one cell in the one or more secondary cells is available; and the processing unit is further configured to send information about a connection resumption failure to the first RAN element by using the sending unit if the terminal device determines that the at least one cell in the one or more secondary cells is unavailable.

In a possible design, the processing unit is further configured to resume the connection to the second RAN element based on the configuration information stored in the storage unit if the at least one cell in the one or more secondary cells is detected and a signal measurement value of the at least one detected cell in the one or more secondary cells is greater than or equal to a threshold.

According to a sixth aspect, a first radio access network RAN element device for establishing a connection is provided. The first RAN element device includes:
a receiving unit, configured to receive connection resumption request information sent by a terminal device, where the connection resumption request information includes an identifier of the terminal device; a processing unit, configured to obtain, based on the identifier of the terminal device in the connection resumption request information received by the receiving unit, configuration information of a secondary cell used by the terminal device in a connected state; and a sending unit, configured to send acknowledgement information to the terminal device, where the acknowledgement information is in response to the connection resumption request information and is used to instruct the terminal device to resume a connection to a second RAN element, and the second RAN element is a RAN element indicated by the configuration information of the secondary cell.

In a possible design, the acknowledgement information further includes information for instructing the terminal device to maintain a configuration of the secondary cell.

In a possible design, the receiving unit is further configured to receive activation indication information sent by the second RAN element, where the activation indication information is used to notify the terminal device that the connection to the second RAN element has been resumed.

In a possible design, the processing unit is further configured to: if the first RAN element determines that the terminal device has no data to transmit within a preset time period, instruct the terminal device to enter an inactive state.

In a possible design, the sending unit is further configured to send inactive time configuration information to the second RAN element, where the inactive time configuration information is used to instruct the second RAN element to report a state notification of the terminal device within the preset time period, the state notification of the terminal device is used to notify the first RAN element of a data transmission status of the terminal device within the preset time period, and the state notification of the terminal device includes at least one of an active state notification and an inactive state notification; and the processing unit is further configured to determine, based on the state notification of the terminal device reported by the second RAN element, that the terminal device has no data to transmit within the preset time period.

According to a seventh aspect, a terminal device for establishing a connection is provided. The terminal device includes:

a processing unit, configured to: obtain measurement configuration information, and determine a to-be-measured object based on information about a cell on which the terminal device currently camps, where the terminal device is in an inactive state in this case, where the processing unit is further configured to: perform cell measurement on the to-be-measured object, and send a cell measurement result to a first RAN element by using a sending unit, where the first RAN element is a RAN element corresponding to the cell on which the terminal device currently camps; and a receiving unit, configured to receive configuration information of a secondary cell sent by the first RAN element, where the processing unit is further configured to establish a connection to a second RAN element based on the configuration information of the secondary cell, where the configuration information of the secondary cell is determined by the first RAN element based on the cell measurement result, and the second RAN element is a RAN element indicated by the configuration information of the secondary cell.

In a possible design, the receiving unit is further configured to receive the measurement configuration information sent by a third RAN element, where the third RAN element is a RAN element at which the terminal device is located when the terminal device enters the inactive state from a connected state, and the measurement configuration information includes information about the cell that is camped on, information about a measurement object, and a mapping relationship between the cell that is camped on and the measurement object.

In a possible design, the receiving unit is further configured to receive a system message sent by the cell that is currently camped on, where the system message includes the measurement configuration information, and the measurement configuration information includes information about a measurement object.

According to an eighth aspect, a first radio access network RAN element device for establishing a connection is provided. The first RAN element device includes:

a receiving unit, configured to receive a cell measurement result for a to-be-measured object that is sent by a terminal device, where the to-be-measured object is determined by the terminal device based on a cell that is currently camped on, and the first RAN element is a RAN element corresponding to the cell on which the terminal device currently camps; and a sending unit, configured to send configuration information of a secondary cell to the terminal device, where the configuration information of the secondary cell is determined by the first RAN element based on the cell measurement result.

In a possible design, the sending unit is further configured to send a system message, where the system message includes information about a measurement object, so that the terminal device determines the to-be-measured object.

According to a ninth aspect, a terminal device for establishing a connection is provided. The terminal device includes a memory, a processor, and a transceiver.

The transceiver is configured to send connection resumption request information to a first radio access network RAN element, where the first RAN element is a RAN element corresponding to a cell on which the terminal device currently camps, the first RAN element is a RAN element indicated by configuration information of a master cell used by the terminal device when the terminal device was in a connected state, the terminal device is now in an inactive state. The memory of the terminal device stores configuration information, and the configuration information includes information about a secondary cell used by the terminal device when in the connected state. The transceiver is further configured to receive acknowledgement information sent by the first RAN element, where the acknowledgement information is in response to the connection resumption request information. The processor is configured to resume a connection between the terminal device and a second RAN element based on the acknowledgement information, where the second RAN element is a RAN element indicated by configuration information of the secondary cell.

In a possible design, the processor is further configured to: if the acknowledgement information includes information for instructing the terminal device to maintain a configuration of the secondary cell, determine to resume the connection to the second RAN element.

In a possible design, the processor is further configured to determine to resume the connection to the second RAN element if the terminal device determines, based on the configuration information of the master cell, that the cell on which the terminal device currently camps and the master cell are the same cell.

In a possible design, the processor is further configured to measure at least one cell in the one or more secondary cells after the terminal device determines that the terminal device needs to send the connection resumption request information to the first RAN element and the terminal device determines, based on the configuration information of the master cell, that the cell on which the terminal device currently camps and the master cell are the same cell.

In a possible design, the processor is further configured to resume the connection to the second RAN element based on the configuration information of the secondary cell that is stored in the memory if the terminal device determines that the at least one cell in the one or more secondary cells is available; and the transceiver is further configured to send information about a connection resumption failure to the first RAN element if the terminal device determines that the at least one cell in the one or more secondary cells is unavailable.

In a possible design, the processor is further configured to resume the connection to the second RAN element based on the configuration information stored in the memory if the at least one cell in the one or more secondary cells is detected and a signal measurement value of the at least one detected cell in the one or more secondary cells is greater than or equal to a threshold.

According to a tenth aspect, a first radio access network (RAN) element device for establishing a connection is provided. The first RAN element device includes a processor and a transceiver.

The transceiver is configured to receive connection resumption request information sent by a terminal device, where the connection resumption request information includes an identifier of the terminal device. The processor is configured to obtain, based on the identifier of the terminal device in the connection resumption request information received by the transceiver, configuration information of a secondary cell used by the terminal device in a connected state. The transceiver is configured to send acknowledgement information for the connection resumption request information to the terminal device, where the acknowledgement information is used to instruct the terminal device to resume a connection to a second RAN element, and the second RAN element is a RAN element indicated by the configuration information of the secondary cell.

In a possible design, the acknowledgement information further includes information for instructing the terminal device to maintain a configuration of the secondary cell.

In a possible design, the transceiver is further configured to receive activation indication information sent by the second RAN element, where the activation indication information is used to notify the terminal device that the connection to the second RAN element has been resumed.

In a possible design, the processor is further configured to: if the first RAN element determines that the terminal device has no data to transmit within a preset time period, instruct the terminal device to enter an inactive state.

In a possible design, the transceiver is further configured to send inactive time configuration information to the second RAN element, where the inactive time configuration information is used to instruct the second RAN element to report a state notification of the terminal device within the preset time period, the state notification of the terminal device is used to notify the first RAN element of a data transmission status of the terminal device within the preset time period, and the state notification of the terminal device includes at least one of an active state notification and an inactive state notification; and the processor is further configured to determine, based on the state notification of the terminal device reported by the second RAN element, that the terminal device has no data to transmit within the preset time period.

According to an eleventh aspect, a terminal device for establishing a connection is provided. The terminal device includes a processor and a transceiver.

The processor is configured to: obtain measurement configuration information, and determine a to-be-measured object based on information about a cell on which the terminal device currently camps, where the terminal device is in an inactive state in this case. The processor is further configured to: perform cell measurement on the to-be-measured object, and send a cell measurement result to a first RAN element by using the transceiver, where the first RAN element is a RAN element corresponding to the cell on which the terminal device currently camps. The transceiver is configured to receive configuration information of a secondary cell sent by the first RAN element. The processor is further configured to establish a connection to a second RAN element based on the configuration information of the secondary cell, where the configuration information of the secondary cell is determined by the first RAN element based on the cell measurement result, and the second RAN element is a RAN element indicated by the configuration information of the secondary cell.

In a possible design, the transceiver is further configured to receive the measurement configuration information sent by a third RAN element, where the third RAN element is a RAN element at which the terminal device is located when the terminal device enters the inactive state from a connected state, and the measurement configuration information includes information about the cell that is camped on, information about a measurement object, and a mapping relationship between the cell that is camped on and the measurement object.

In a possible design, the transceiver is further configured to receive a system message sent by the cell that is currently camped on, where the system message includes the measurement configuration information, and the measurement configuration information includes information about a measurement object.

According to a twelfth aspect, a first radio access network RAN element device for establishing a connection is provided. The first RAN element device includes:

a transceiver, configured to receive a cell measurement result for a to-be-measured object that is sent by a terminal device, where the to-be-measured object is determined by the terminal device based on a cell that is currently camped on, and the first RAN element is a RAN element corresponding to the cell on which the terminal device currently camps, where the transceiver is configured to send configuration information of a secondary cell to the terminal device, where the configuration information of the secondary cell is determined by the first RAN element based on the cell measurement result.

In a possible design, the transceiver is further configured to send a system message, where the system message includes information about a measurement object, so that the terminal device determines the to-be-measured object.

According to a thirteenth aspect, a system for establishing a connection is provided. The system includes the terminal device according to the fifth aspect and the first radio access network RAN element device according to the sixth aspect.

According to a fourteenth aspect, a system for establishing a connection is provided. The system includes the terminal device according to the seventh aspect and the first radio access network RAN element device according to the eighth aspect.

According to a fifteenth aspect, an embodiment of this application provides a computer storage medium, configured to store a computer software instruction used by a terminal device, where the computer software instruction includes a program used to execute the foregoing aspects.

According to a sixteenth aspect, an embodiment of this application provides a computer storage medium, configured to store a computer software instruction used by an access network element device, where the computer software instruction includes a program used to execute the foregoing aspects.

According to a seventeenth aspect, a chip system for establishing a connection is provided. The chip system generates connection resumption request information, where the connection resumption request information is sent to a first radio access network RAN element, the first RAN element is a RAN element corresponding to a cell on which a terminal device currently camps and the first RAN element is a RAN element indicated by configuration information of a master cell used by the terminal device in a connected state, the terminal device is in an inactive (inactive) state, the terminal device stores configuration information, and the configuration information includes information about a secondary cell used by the terminal device in the connected state. The chip system obtains acknowledgement information sent by the first RAN element, where the acknowledgement information is in response to the connection resumption request information. The chip system resumes a connection between the terminal device and a second RAN element based on the acknowledgement information, where the second RAN element is a RAN element indicated by configuration information of the secondary cell.

In a possible design, if the acknowledgement information obtained by the chip system includes information for instructing the terminal device to maintain a configuration of the secondary cell, the chip system determines to resume the connection to the second RAN element.

In a possible design, the chip system determines to resume the connection to the second RAN element if the chip system determines, based on the configuration information of the master cell, that the cell on which the terminal device currently camps and the master cell are the same cell.

In a possible design, the chip system measures at least one cell in the one or more secondary cells after the chip system determines that the chip system needs to send the connection resumption request information to the first RAN element and the chip system determines, based on the configuration information of the master cell, that the cell on which the terminal device currently camps and the master cell are the same cell.

In a possible design, the chip system determines, based on the configuration information of the secondary cell, to resume the connection to the second RAN element if the chip system determines that the at least one cell in the one or more secondary cells is available; or the chip system generates information about a connection resumption failure if the chip system determines that the at least one cell in the one or more secondary cells is unavailable, where the information about the connection resumption failure is sent to the first RAN element.

In a possible design, the chip system determines to resume the connection to the second RAN element based on the configuration information of the secondary cell if the chip system detects the at least one cell in the one or more secondary cells and a signal measurement value of the at least one detected cell in the one or more secondary cells is greater than or equal to a threshold.

According to an eighteenth aspect, a chip system for establishing a connection is provided. The chip system obtains connection resumption request information sent by a terminal device, where the connection resumption request information includes an identifier of the terminal device; the chip system obtains, based on the identifier of the terminal device, configuration information of a secondary cell used by the terminal device in a connected state; and the chip system generates acknowledgement information, where the acknowledgement information is sent to the terminal device, the acknowledgement information is used to respond to the connection resumption request information, the acknowledgement information is used to instruct the terminal device to resume a connection to a second RAN element, and the second RAN element is a RAN element indicated by the configuration information of the secondary cell.

In a possible design, the acknowledgement information generated by the chip system further includes information for instructing the terminal device to maintain a configuration of the secondary cell.

In a possible design, the chip system generates activation indication information, where the activation indication information is sent to the second RAN element, and the activation indication information is used to notify the terminal device that the connection to the second RAN element has been resumed.

In a possible design, if the chip system determines that the terminal device has no data to transmit within a preset time period, the chip system instructs the terminal device to enter an inactive (inactive) state.

In a possible design, the chip system generates inactive time configuration information, where the inactive time configuration information is sent to the second RAN element, the inactive time configuration information is used to instruct the second RAN element to report a state notification of the terminal device within the preset time period, the state notification of the terminal device is used to notify the first RAN element of a data transmission status of the terminal device within the preset time period, and the state notification of the terminal device includes at least one of an active state notification and an inactive state notification; and the chip system determines, based on the state notification of the terminal device that is reported by the second RAN element, that the terminal device has no data to transmit within the preset time period.

According to a nineteenth aspect, a chip system is provided. The chip system obtains measurement configuration information, and determines a to-be-measured object based on information about a cell on which a terminal device currently camps, where the terminal device is in an inactive state; the chip system performs cell measurement on the to-be-measured object, where a cell measurement result is sent to a first RAN element, and the first RAN element is a RAN element corresponding to the cell on which the terminal device currently camps; the chip system obtains configuration information of a secondary cell sent by the first RAN element; and the chip system establishes a connection to a second RAN element based on the configuration information of the secondary cell, where the configuration information of the secondary cell is determined by the first RAN element based on the cell measurement result, and the second RAN element is a RAN element indicated by the configuration information of the secondary cell.

In a possible design, the measurement configuration information obtained by the chip system is sent by a third RAN element, where the third RAN element is a RAN element at which the terminal device is located when the terminal device enters the inactive state from a connected state, and the measurement configuration information includes information about the cell that is camped on, information about a measurement object, and a mapping relationship between the cell that is camped on and the measurement object.

In a possible design, the measurement configuration information obtained by the chip system is carried in a system message sent by the cell that is currently camped on. The system message includes the measurement configuration information, and the measurement configuration information includes information about a measurement object.

According to a twentieth aspect, a chip system for establishing a connection is provided. The chip system obtains a cell measurement result for a to-be-measured object that is sent by a terminal device, where the to-be-measured object is determined by the terminal device based on a cell that is currently camped on, and the first RAN element is a RAN element corresponding to the cell on which the terminal device currently camps; and the chip system generates configuration information of a secondary cell, where the configuration information of the secondary cell is sent to the terminal device, and the configuration information of the secondary cell is determined by the chip system based on the cell measurement result.

In a possible design, the chip system generates a system message, where the system message includes information about a measurement object.

DESCRIPTION OF EMBODIMENTS

The following clearly describes the technical solutions in the embodiments of this application with reference to the accompanying drawings in the embodiments of this application.

The technical solutions of this application may be applied to a 2nd-generation (2G) communications network, a 3rd-generation (3G) communications network, a 4th-generation (4G) communications network, a 5th-generation (5G) communications network, and a subsequent evolved network.

Figure 1:
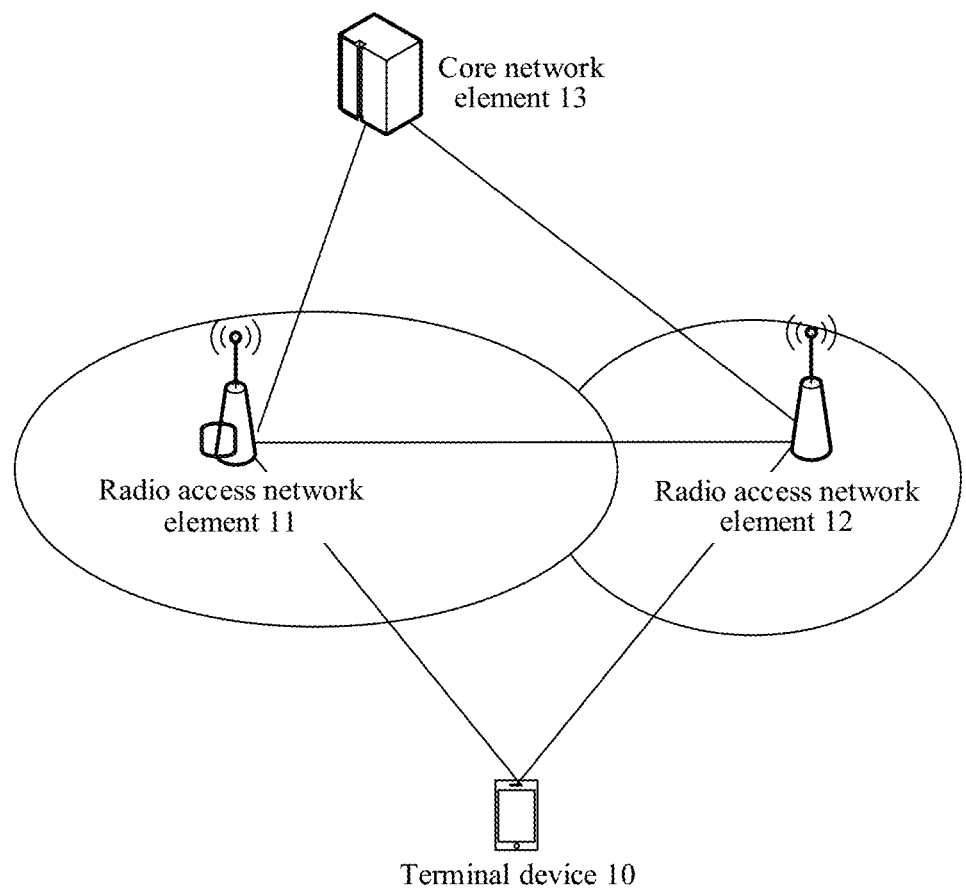
FIG. 1 is a schematic diagram of a network architecture of a communications network according to an embodiment of this application.

FIG. 1 is a schematic diagram of a network architecture of a communications network according to an embodiment of this application. As shown in FIG. 1, the communications network includes at least one terminal device 10, a master RAN element 11, at least one secondary RAN element 12, and a core network element 13.

The terminal device may be a terminal device such as a mobile phone, a tablet computer, a notebook computer, a UMPC (ultra-mobile personal computer), a netbook, or a PDA (personal digital assistant). FIG. 1 shows only one terminal device 10, but a person skilled in the art may know that a quantity of terminal devices 10 is not limited to one.

The network element is an element for a network. The RAN element is an element that is responsible for an access function of a terminal device in a cell in an access network. RAN elements (including a master RAN element and a secondary RAN element) may correspond to different devices. For example, in a 2G communications network, the RAN elements correspond to a base station and a base station controller. In a 3G communications network, the RAN elements correspond to a base station and a radio network controller (RNC). In a 4G communications network, the RAN element corresponds to an evolved NodeB (eNB). In a 5G communications network, the RAN element corresponds to a 5th-generation access network device.

A core network is a main part of a communications network, is connected to each access network, and is responsible for communication and management of a service accessed by each access network. The core network element 13 is a node responsible for a management function of the communications network. Alternatively, the core network element 13 may correspond to different devices. For example, in the 3G communications network, the core network element 13 corresponds to a serving general packet radio service (GPRS) support node (SGSN) or a gateway general packet radio service (GPRS) support node (GGSN). In the 4G communications network, the core network element corresponds to a mobility management node function (mobility management entity or MME) or a serving gateway (S-GW). In the 5G communications network, the core network element corresponds to 5th-generation core network element devices, for example, including an access and mobility management function (AMF) and a user plane function (UPF).

It should be noted that a same access technology or different access technologies may be used on the master RAN element and the secondary RAN element. In addition, FIG. 1 shows only one terminal device, two RAN elements, and one core network element. However, a quantity of terminal devices, a quantity of RAN elements, a quantity of core network elements, and a specific connection manner among the network elements are not limited in this embodiment of this application.

In FIG. 1, the terminal device 10 is in a multi-connectivity mode. The multi-connectivity mode is a mode in which the terminal device keeps connection to a plurality of access network elements at the same time. In the plurality of access network elements, one access network element is a master access network element, and other access network elements are secondary access network elements. A dual-connectivity mode is used for description herein. The dual-connectivity mode is a connectivity mode in which one access network element is a master access network element, and the other access network element is a secondary access network element. In the dual-connectivity mode, as shown in FIG. 1, the terminal device 10 is connected to the master RAN element 11 and the secondary RAN element 12 at the same time. Generally, the master RAN element may configure different bearer types for the terminal device based on network load and a service attribute of the terminal device, to transmit service data. There are mainly four bearer types configured by the master RAN element for the terminal device, which are: 1. a master cell bearer (MCG bearer), which means that service data is sent from the core network to the master RAN element, and is sent by the master RAN element to the terminal device; 2. a split bearer (split bearer), which means that service data is sent from the core network to the master RAN element, and is sent by the master RAN element and the secondary RAN element to the terminal device; 3. a secondary cell bearer (SCG bearer), which means that service data is sent from the core network to the secondary RAN element, and is sent by the secondary RAN element to the terminal device; and 4. a secondary cell split bearer (SCG split bearer), which means that service data is sent from the core network to the secondary RAN element, and is sent by the secondary RAN element and the master RAN element to the terminal device.

Figure 2:
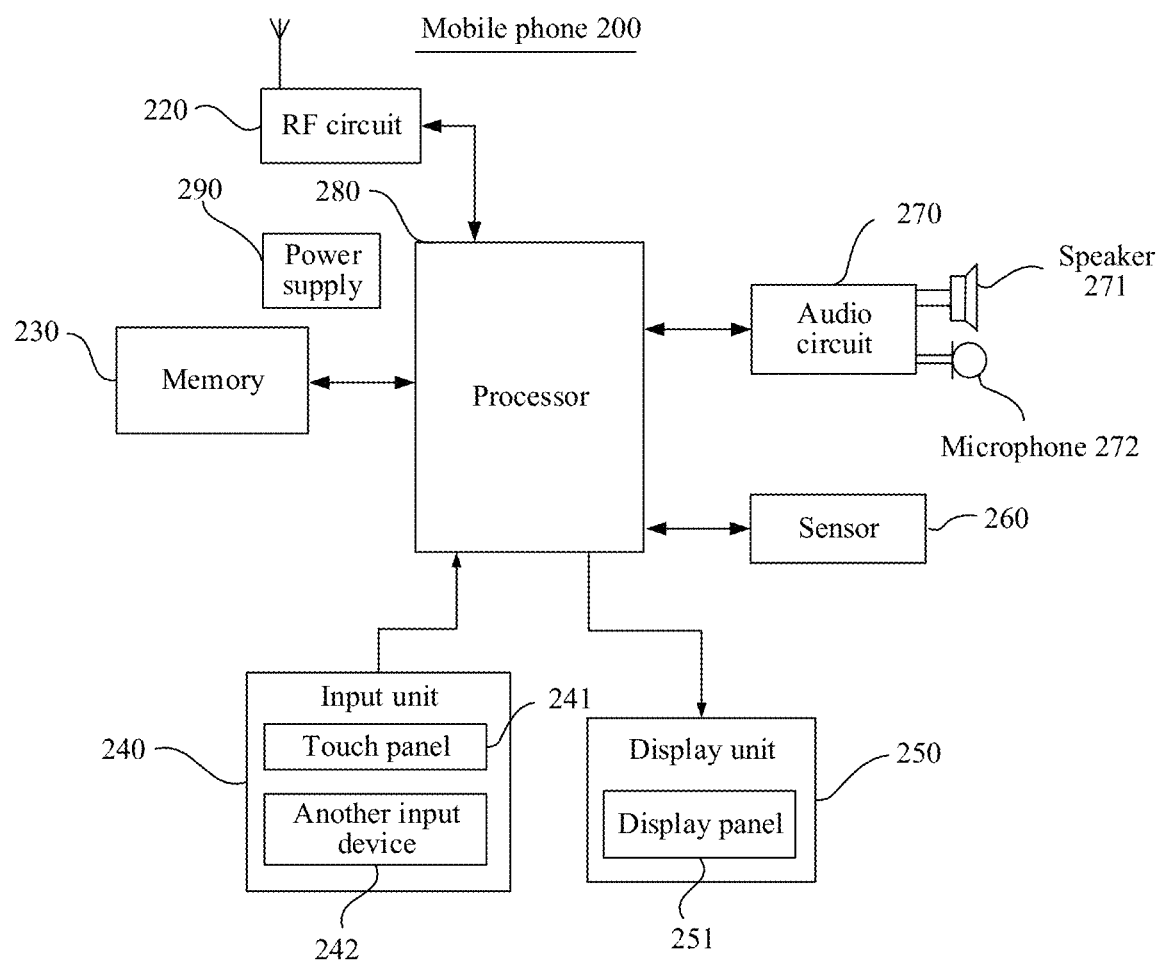
FIG. 2 is a schematic structural diagram of a terminal device according to an embodiment of this application.

FIG. 2 is a schematic structural diagram of a terminal device according to an embodiment of this application, which may be used to perform methods implemented in the embodiments of this application. For ease of description, only parts related to this embodiment of this application are shown. For specific technical details that are not disclosed, refer to the embodiments of this application shown in FIG. 3A to FIG. 5.

That the terminal device is a mobile phone is used as an example to describe this embodiment of this application. FIG. 2 is a block diagram of a portion of the structure of a mobile phone 200 related to the embodiments of this application.

As shown in FIG. 2, the mobile phone 200 includes components such as a radio frequency (RF) circuit 220, a memory 230, an input unit 240, a display unit 250, a sensor 260, an audio circuit 270, a processor 280, and a power supply 290. A person skilled in the art may understand that, the structure of the mobile phone shown in FIG. 2 does not constitute a limitation on the mobile phone. The mobile phone may include more or fewer components than those shown in the figure, or some components may be combined, or different component arrangements may be used.

The following describes the components of the mobile phone 200 in detail with reference to FIG. 2.

The RF circuit 220 may be configured to receive and send signals in an information sending and receiving process or a call process. In particular, after receiving downlink information from a RAN element, the RF circuit 220 sends the downlink information to the processor 280 for processing. In addition, the RF circuit 220 sends uplink data to the RAN element. Generally, the RF circuit includes but is not limited to an antenna, at least one amplifier, a transceiver, a coupler, an LNA (low noise amplifier), a duplexer, and the like. In addition, the RF circuit 220 may further communicate with a network and another device through wireless communication. The wireless communication may use any communication standard or protocol, including, but not limited to, GSM (global system of mobile communication), GPRS (general packet radio service), CDMA (code division multiple access), WCDMA (wideband code division multiple access), LTE (long term evolution), an email, an SMS (short messaging service), and the like.

In this embodiment of this application, the RF circuit 220 is configured to send a connection resumption request, a connection resumption failure, data, or the like to the RAN element. The RF circuit 220 is further configured to receive signaling and data sent by the RAN element, for example, a suspension indication, measurement configuration information, configuration information of a secondary cell, and an acknowledgment message for the connection resumption request. The RF circuit 220 may be further configured to: perform cell measurement based on measurement information configured by the RAN element, send a measurement result to the RAN element, or the like.

The memory 230 may be configured to store a software program and a module. The processor 280 runs the software program and the module stored in the memory 230, to perform various functional applications and data processing of the mobile phone 200. The memory 230 may mainly include a program storage area and a data storage area. The program storage area may store an operating system, an application program required by at least one function (such as an audio play function or an image display function), or the like. The data storage area may store data (such as audio data, image data, or an address book) created based on use of the mobile phone 200, or the like. In addition, the memory 230 may include a high-speed random access memory, and may further include a nonvolatile memory, for example, at least one magnetic disk storage device, a flash memory device, or another volatile solid-state storage device.

In this embodiment of this application, the memory 230 may store a software program and data for performing the method steps in this embodiment. The data may be, for example, configuration information of a master RAN element and a secondary RAN element of the terminal device, and the configuration information includes configuration information of a master cell, the configuration information of a secondary cell, or the like.

The input unit 240 may be configured to receive input digital or character information and generate key signal input related to a user setting and function control of the mobile phone 200. Specifically, the input unit 240 may include a touchscreen 141 and another input device 142. The touchscreen 141 is also referred to as a touch panel, and may collect a touch operation (for example, an operation performed by a user on or near the touchscreen 141 by using any proper object or accessory such as a finger or a stylus) performed by the user on or near the touchscreen 141, and drive a corresponding connection apparatus by using a preset program. Optionally, the touchscreen 141 may include two parts: a touch detection apparatus and a touch controller. The touch detection apparatus detects a touch location of the user, detects a signal brought by a touch operation, and transmits the signal to the touch controller. The touch controller receives touch information from the touch detection apparatus, converts the touch information into touch coordinates, and sends the touch coordinates to the processor 280. In addition, the touch controller can receive and execute a command sent by the processor 280. In addition, the touchscreen 141 may be implemented in a plurality of types such as a resistive type, a capacitive type, an infrared type, and a surface acoustic wave type. The input unit 240 may further include another input device 142 in addition to the touchscreen 141. Specifically, the other input device 142 may include but is not limited to one or more physical keyboards, a function key (such as a volume control key or a power key), a track ball, a mouse, and a joystick.

The display unit 250 may be configured to display information entered by the user or information provided to the user, and various menus of the mobile phone 200. The display unit 250 may include a display panel 151. Optionally, the display panel 151 may be configured in a form of an LCD (liquid crystal display), an OLED (organic light-emitting diode), or the like. Further, the touchscreen 141 may cover the display panel 151. After detecting a touch operation performed on or near the touchscreen 141, the touchscreen 141 sends the touch operation to the processor 280 to determine the type of the touch event, and then the processor 280 provides corresponding visual output on the display panel 151 based on the type of the touch event. In FIG. 2, the touchscreen 141 and the display panel 151 serve as two independent components to implement input and output functions of the mobile phone 200. However, in some embodiments, the touchscreen 141 and the display panel 151 may be integrated to implement the input and output functions of the mobile phone 200.

The mobile phone 200 further includes the sensor 260, including: an acceleration sensor, a gyroscope, a magnetometer, or the like. In addition, other sensors such as a gravity sensor, a barometer, a hygrometer, a thermometer, and an infrared sensor may be disposed in the mobile phone 200. Details are not described herein.

The audio circuit 270, a speaker 171, and a microphone 172 may provide an audio interface between the user and the mobile phone 200. The audio circuit 270 may transmit, to the speaker 171, a received electrical signal converted from audio data, and the speaker 171 converts the electrical signal into a sound signal for output. On the other hand, the microphone 172 converts a collected sound signal into an electrical signal. The audio circuit 270 receives the electrical signal and converts the electrical signal into audio data, and then outputs the audio data to the RF circuit 220, so that the audio data is sent to, for example, another mobile phone, or the audio data is stored in the memory 230 for further processing.

The processor 280 is a control center of the mobile phone 200, connects parts of the entire mobile phone by using various interfaces and routes, runs or executes the software program and/or the module stored in the memory 230, and invokes data stored in the memory 230, to perform various functions and data processing of the mobile phone 200, to perform overall monitoring on the mobile phone. Optionally, the processor 280 may include one or more processing units. Preferably, an application processor and a modem processor may be integrated into the processor 280. The application processor mainly processes an operating system, a user interface, an application program, or the like. The modem processor mainly processes wireless communication. It may be understood that, alternatively, the modem processor may not be integrated into the processor 280.

In this embodiment of this application, the processor 280 may be configured to determine that the terminal device needs to transmit data, and may be further configured to establish a connection to the secondary RAN element based on the configuration information of the secondary cell. The processor 280 may be further configured to: determine, based on the configuration information of the master cell that is stored in the memory 230, whether a cell on which the terminal device currently camps and the master cell that is stored in the memory 230 are the same cell, determine whether a connection resumption failure message needs to be uploaded to the RAN element, or the like.

The mobile phone 200 further includes the power supply 290 (such as a battery) that supplies power to each component. Preferably, the power supply may be logically connected to the processor 280 by using a power management system, to implement functions such as charging management, discharging management, and power consumption management by using the power management system.

Although not shown in the figure, the mobile phone 200 may further include a Wi-Fi (wireless fidelity) module, a Bluetooth module, or the like. Details are not described herein.

In the communications network shown in FIG. 1, in such a dual-connectivity mode of the terminal device 10, if the terminal device 10 has no data to transmit within an entire preset time, the master RAN element controls the terminal device 10 to enter an inactive state from a connected state, and allocates corresponding context information and management area information to the terminal device 10. When the terminal device 10 is in the inactive state, if the terminal device 10 moves in a management area and has no data to transmit, the terminal device 10 does not need to notify the master RAN element. This helps to save network resources. When the terminal device 10 is in the inactive state, if there is data to be transmitted, a connection between the terminal device 10 and the master RAN element and a connection between the terminal device 10 and the secondary RAN element need to be resumed. Specifically, the terminal device 10 first resumes the connection to the master RAN element, then performs cell measurement based on measurement configuration information determined by the master RAN element, and feeds back a measurement result to the master RAN element. In this way, the master RAN element may select a new secondary RAN element for the terminal device 10 based on the measurement result that is fed back, and add configuration information of a new secondary cell to the terminal device 10. The terminal device 10 may establish a connection to the new secondary RAN element based on the configuration information of the new secondary cell. Apparently, in a process of resuming the connection by the terminal device 10, steps of resuming the connection to the secondary RAN element are relatively complex and time-consuming, and this causes problems of a high network transmission delay and low efficiency. Therefore, the method provided in this embodiment of this application may be used to shorten the time for connecting the terminal device 10 to the secondary RAN element and improve network transmission efficiency.

Figure 3A:
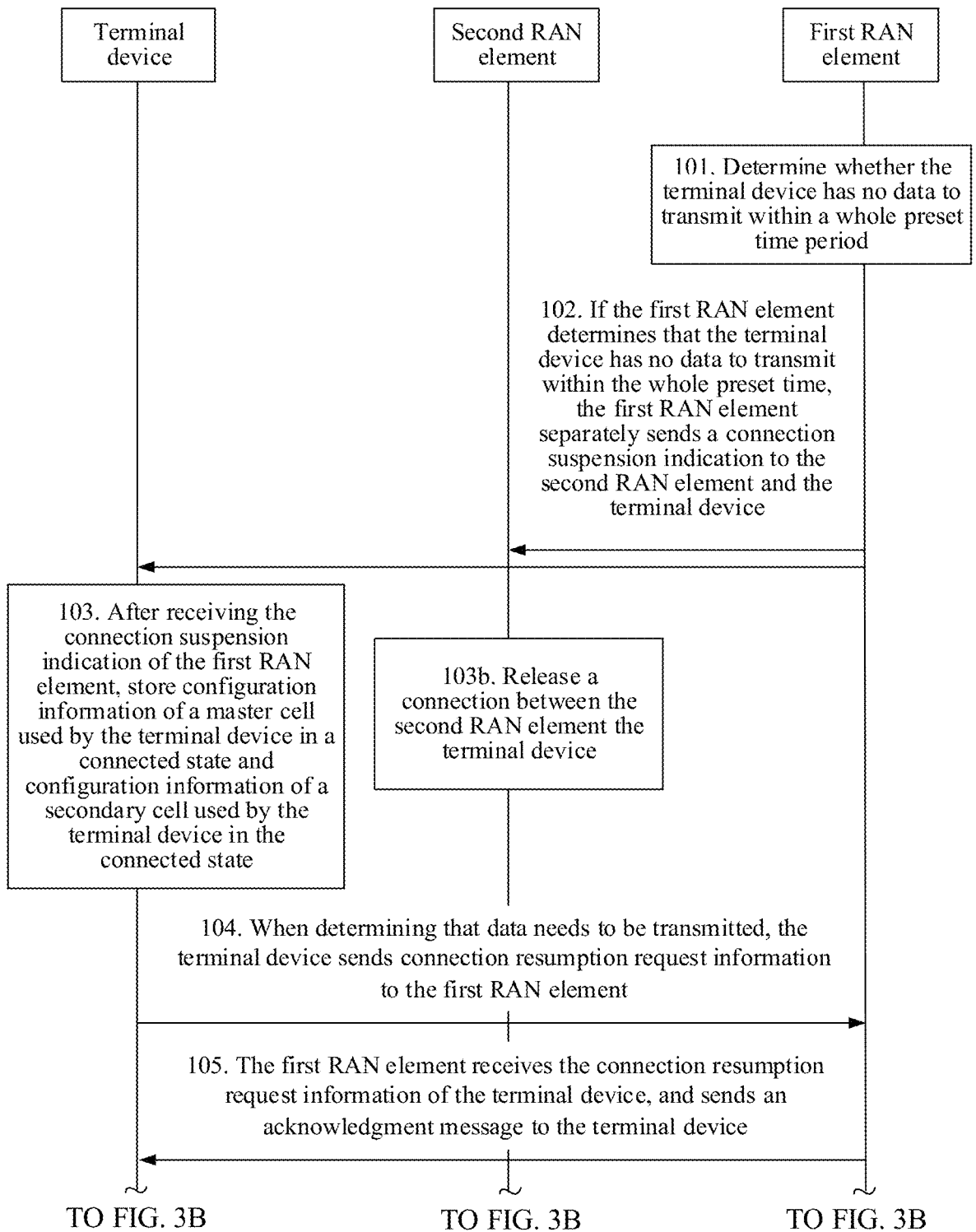
FIG. 3A and FIG. 3B are a schematic flowchart of a method for establishing a connection according to an embodiment of this application.
Figure 3B:
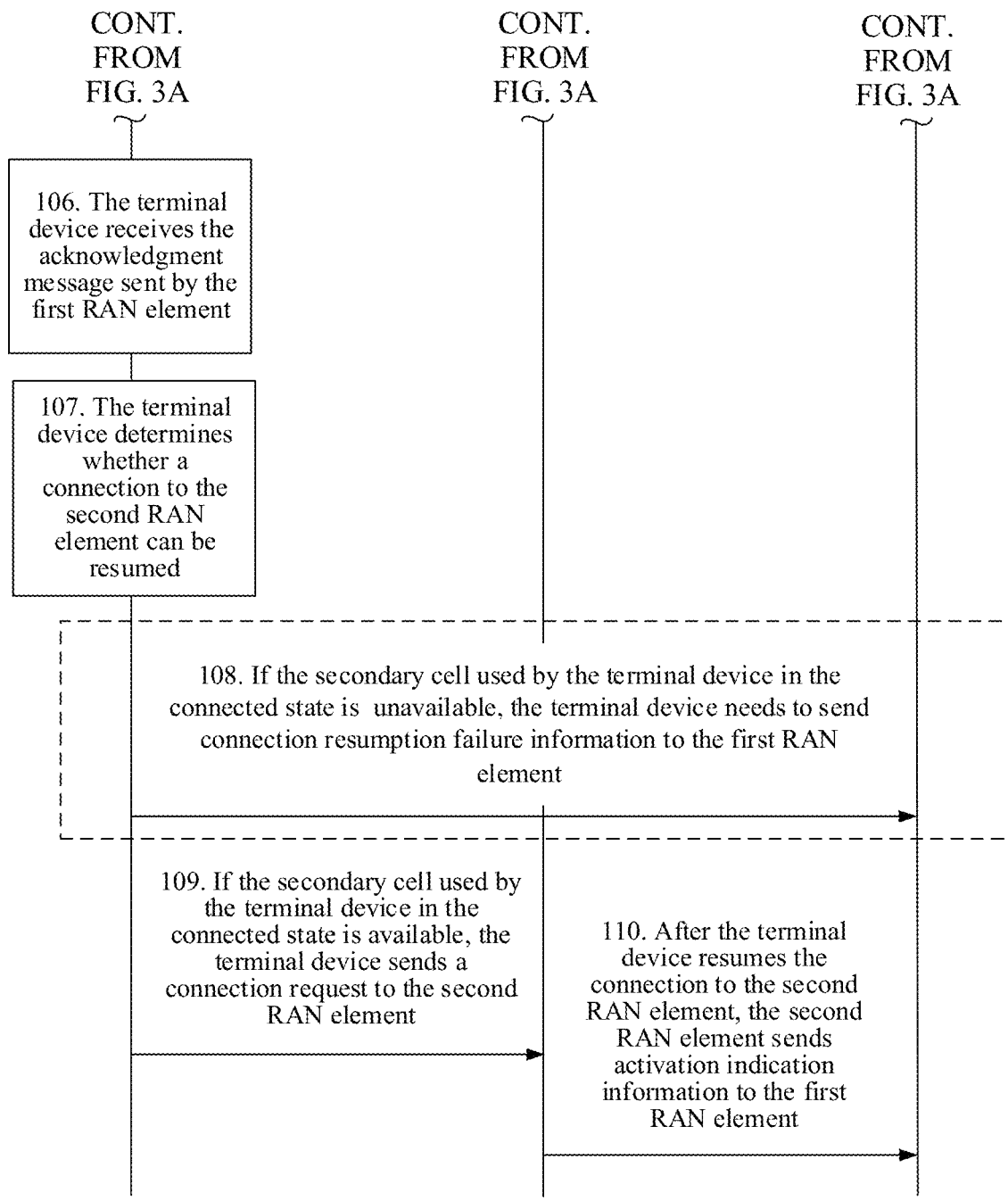

Therefore, an embodiment of this application provides a method for establishing a connection. The method may be applied to the communications network shown in FIG. 1. As shown in FIG. 3A and FIG. 3B, the method includes the following steps.

101. A first RAN element determines whether a terminal device has no data to transmit within a preset time period.

The first RAN element is a RAN element at which a master cell of the terminal device is located. The master cell is a cell providing security parameter input to the terminal device, and determines non-access stratum parameters of the terminal device. The parameters may be used for a connection between the terminal device and the master RAN element. The preset time may be a predefined time, for example, may be 10 seconds. The preset time may also be set in the following manner. Statistics about previous data transmissions of the terminal device are collected to obtain an average interval time between two data transmissions or an average interval time between two data transmissions in a same time period, and the preset time is set to a particular multiple of the average interval time. In this embodiment of this application, the preset time is set beforehand.

Specifically, if it is determined that the terminal device has no data to transmit within the whole preset time, the first RAN element may control the terminal device to enter an inactive state from a connected state, in other words, perform step 102. If it is determined that the terminal device has transmitted data within the preset time, the first RAN element determines to maintain the connected state of the terminal device.

It should be noted that, for a data transmission status between the terminal device and the RAN element, for example, for a bearer type of the terminal device, the first RAN element may determine, by using a corresponding determining method, whether the terminal device has no data to transmit within the whole preset time. For a specific determining method, refer to the following descriptions.

Optionally, the terminal device may determine whether no data is transmitted within the preset time, and if the terminal device determines that no data is transmitted during the preset time period, the terminal device reports the information to the first RAN element.

102. If the first RAN element determines that the terminal device has no data to transmit within the preset time, the first RAN element separately sends a connection suspension indication to a second RAN element and the terminal device.

The second RAN element is a secondary RAN element of the terminal device. A cell included in the secondary RAN element is an SCG, and the SCG further includes a main secondary cell and optionally further includes at least one auxiliary secondary cell. The connection suspension indication is used to instruct the terminal device to enter the inactive state from the connected state. The connection suspension indication, for example, may be a connection suspension request message, a connection release request, or a connection inactivation request.

103. After receiving the connection suspension indication of the first RAN element, the terminal device stores configuration information of the terminal device in the connected state.

The configuration information includes configuration information of a master cell used by the terminal device in the connected state and configuration information of a secondary cell used by the terminal device in the connected state. The configuration information of the master cell includes at least an identifier and frequency information of the master cell, or the like. The configuration information of the master cell may be used to connect to the master RAN element by the terminal device. The configuration information of the secondary cell includes an identifier and frequency information of the secondary cell, or the like, and may be used to connect to the secondary RAN element by the terminal device. The secondary cell may be a carrier aggregation secondary cell, or may be a secondary cell in an MCG in dual-connectivity, a main secondary cell in the SCG, or another secondary cell.

Specifically, after receiving the suspension indication sent by the first RAN element, the terminal device enters the inactive state. It should be noted that in the prior art, the terminal device usually releases a connection to the secondary cell, and deletes locally stored configuration information of the secondary cell in this case. In this embodiment of this application, the terminal device stores the configuration information of the secondary cell of the terminal device, so that the configuration information of the master cell and the configuration information of the secondary cell are used in a subsequent connection resumption process. The terminal device may locally store the configuration information of the master cell and the configuration information of the secondary cell, or may store the configuration information of the master cell and the configuration information of the secondary cell in a third-party device, and may invoke the configuration information of the master cell and the configuration information of the secondary cell when the terminal device needs to use the configuration information of the master cell and the configuration information of the secondary cell.

It should be noted that after receiving the connection suspension indication sent by the first RAN element, the second RAN element releases a connection between the second RAN element and the terminal device, as shown by 103b in the figure.

104. When determining that there is data that needs to be transmitted, the terminal device sends connection resumption request information to the first RAN element.

The first RAN element is a RAN element corresponding to a cell on which the terminal device currently camps. To be specific, the first RAN element allows the terminal device in the inactive state to access a core network by using the cell that is currently camped on. In addition, the first RAN element herein is a RAN element indicated by the configuration information of the master cell used by the terminal device in the connected state. In other words, the terminal device requests to resume the connection in an original master cell.

The connection resumption request information is used to indicate the terminal device's entering into the connected state again from the inactive state. This process may also be referred to as resumption, activation, or reactivation. The connection resumption request information may be carried in a message such as a connection resumption request, a connection activation request, or a connection reactivation request.

Specifically, if the terminal device receives a paging message or the terminal device determines that there is uplink data that needs to be transmitted, the terminal device determines that the data needs to be transmitted. In this case, the terminal device initiates a connection resumption request to the cell that is currently camped on. Because the cell that is camped on and the master cell used by the terminal device in the connected state are the same cell at this time, it may be considered that the location of the terminal device when the terminal device is in the inactive state is not greatly changed compared with the location of the terminal device when the terminal is the connected state previously. In this case, statuses of the cells for a current location of the terminal device are also approximately the same. Therefore, a secondary cell previously used by the terminal device may be used as a current secondary cell. That is, the configuration information of a cell used by the terminal device in the connected state may still be used, to connect to the second RAN element indicated by the configuration information of the secondary cell. In this case, step 105 is performed. Otherwise, if the terminal device is not located at the master cell used when the terminal device is in the connected state, it is considered that the location of the terminal device has changed greatly. The RAN element corresponding to the cell on which the terminal device currently camps selects a new master RAN element for the terminal device, and the master RAN element is changed. Correspondingly, the previous secondary RAN element cannot continue to be used, and the new master RAN element needs to reselect a new secondary RAN element for the terminal device and determines configuration information of the new SCG.

Optionally, after the terminal device determines that the connection needs to be resumed or sends the connection resumption request information to the first RAN element, if the terminal device determines that the cell that is currently camped on and the master cell used by the terminal device in the connected state are the same cell, the terminal device may start to measure at least one secondary cell used by the terminal device in the connected state and may preferentially measure the main secondary cell. This is because there is a higher probability that the terminal device can successfully resume a connection to the secondary cell used by the terminal device in the connected state if the master cell used by the terminal device in the connected state requests to resume a connection. Therefore, a process of resuming the connection to the secondary cell used by the terminal device in the connected state can be accelerated when the secondary cell used by the terminal device in the connected state is measured in advance.

It should be noted that the terminal device may also start cell measurement when the terminal device receives an acknowledgment message for the connection resumption request information, that is, step 106. A specific time point for starting cell measurement is not limited in this embodiment of this application. Optionally, after the cell measurement ends, a cell measurement result is reported to the first RAN element, so that the first RAN element determines, based on the cell measurement result, whether the measured cell is available.

105. The first RAN element receives the connection resumption request information of the terminal device, and sends an acknowledgment message to the terminal device.

Optionally, the connection resumption request information further carries an identifier of the terminal device. In this case, after receiving the connection resumption request information of the terminal device, the first RAN element first determines the locally stored context information of the terminal device based on the identifier of the terminal device in the connection resumption information, and determines, in the context information of the terminal device, the master cell used by the terminal device in the connected state. Further, it is determined whether the cell currently accessed by the terminal device and the master cell used by the terminal device in the connected state are the same cell. If the cell currently accessed by the terminal device and the master cell used by the terminal device in the connected state are the same cell, the first RAN element sends an acknowledgment message to the terminal device, to instruct the terminal device to maintain a configuration of the secondary cell used by the terminal device in the connected state.

Optionally, the acknowledgment message for the connection resumption request information of the terminal device may further carry a threshold. If a signal measurement value obtained after the terminal device measures the cell is greater than or equal to the threshold, it indicates that the cell can support the terminal device in performing data transmission. If the obtained signal measurement value is less than the threshold, it indicates that the cell cannot support the terminal device in performing data transmission. That is, the cell cannot be used as the secondary cell used when the terminal device resumes to the connected state. The threshold may be a predefined value, or may be a value dynamically configured by the first RAN element based on a network status or a service type of the terminal device. It should be noted that the threshold may also be carried in the connection suspension indication sent by the first RAN element, or carried in the acknowledgment message, sent by the first RAN element to the terminal device, for the connection suspension indication. A manner of obtaining the threshold by the terminal device is not limited in this embodiment of this application.

106. The terminal device receives the acknowledgment message, sent by the first RAN element, for the connection resumption request.

Specifically, the terminal device determines, based on the locally stored configuration information of the master cell, whether the cell on which the terminal device currently camps and the master cell used by the terminal device in the connected state are the same cell, and if yes, performs 107; or if the acknowledgment message includes a message for instructing the terminal device to maintain the configuration of the secondary cell, performs 107.

107. The terminal device determines whether the connection to the second RAN element can be resumed.

The second RAN element is a RAN element indicated by the configuration information of the secondary cell used by the terminal device when in the connected state. In other words, the terminal device determines that the connection to the secondary cell used by the terminal device in the connected state can be resumed. If the first RAN element of the terminal device and the RAN element at which the secondary cell used by the terminal device in the connected state is located are the same cell, the terminal device determines that the connection to the second RAN element can be resumed. It should be noted that the first RAN element and the second RAN element may be the same RAN element or different RAN elements.

Specifically, refer to the descriptions in step 104. If the terminal device determines, when the terminal device performs cell measurement, that the secondary cell used by the terminal device in the connected state is still available, the terminal device determines that the connection to the secondary cell used by the terminal device in the connected state can be resumed, and performs step 109. If it is determined that the secondary cell used by the terminal device in the connected state is unavailable, step 108 is performed.

Optionally, the determining whether the secondary cell used by the terminal device in the connected state is available includes: further determining, by the terminal device, a threshold; and if a signal measurement value of the secondary cell on which cell measurement is performed is greater than or equal to the threshold, determining that the secondary cell used by the terminal device in the connected state is available. When the terminal device performs cell measurement, if the terminal device does not detect the secondary cell used by the terminal device in the connected state or the signal measurement value of the secondary cell is less than the threshold, it is determined that the secondary cell that is used by the terminal device in the connected state and that is stored in the terminal device is unavailable.

108. The terminal device needs to send information about a connection resumption failure to the first RAN element.

Optionally, the information about the connection resumption failure may further carry a measurement result of the terminal device. The measurement result may be a result of cell measurement performed on the at least one secondary cell used by the terminal device in the connected state, or may be a result of cell measurement on a master cell used by the terminal device in the connected state by performing intra-frequency or inter-frequency neighboring cell measurement.

109. The terminal device sends a connection request to the second RAN element.

The connection request is used to resume the connection to the second RAN element by the terminal device, and includes initiating a random access procedure to the second RAN element.

110. After the terminal device resumes the connection to the second RAN element, the second RAN element sends activation indication information to the first RAN element.

The activation indication information is used to notify the first RAN element that the terminal device has resumed the connection to the second RAN element.

A method for establishing a connection is provided in this embodiment of this application. After the terminal device in the inactive state resumes the connection to the master RAN element, the terminal device performs cell measurement based on the measurement configuration information of the master RAN element; then, the master RAN element allocates a new secondary RAN element to the terminal device based on a cell measurement result and configures information about the new secondary RAN element. An entire connection resumption process is complex and time-consuming, and consequently, network transmission efficiency is low. However, in this application, when entering the inactive state, the terminal device stores the configuration information of the master cell and the configuration information of the secondary cell. When determining that data needs to be transmitted, the terminal device may resume a connection to an original RAN element based on the configuration information of the secondary cell. It can be learned that, this application simplifies the steps of resuming the connection by the terminal device, accelerates the process of resuming the connection by the terminal device, and improves network transmission efficiency.

To better understand this embodiment of this application, the step of determining whether the terminal device has no data to transmit within the entire preset time in step 101 in this embodiment of this application is further described in detail.

The data transmission status between the terminal device and the RAN element mainly includes the following two cases:

Case 1: All data between the terminal device and the core network element passes through the master RAN element. For example, the types of bearers of the terminal device include only a master cell bearer or a master cell split bearer. Therefore, the master RAN element may determine, based on a data transmission status of the master RAN element, whether the terminal device has no data to transmit within the entire preset time. If the master RAN element transmits data of the terminal device within the preset time, it is determined that the terminal device has data to transmit within the preset time; or if the master RAN element does not transmit data of the terminal device within the preset time, it is determined that the terminal device has no data to within the preset time.

Figure 4:
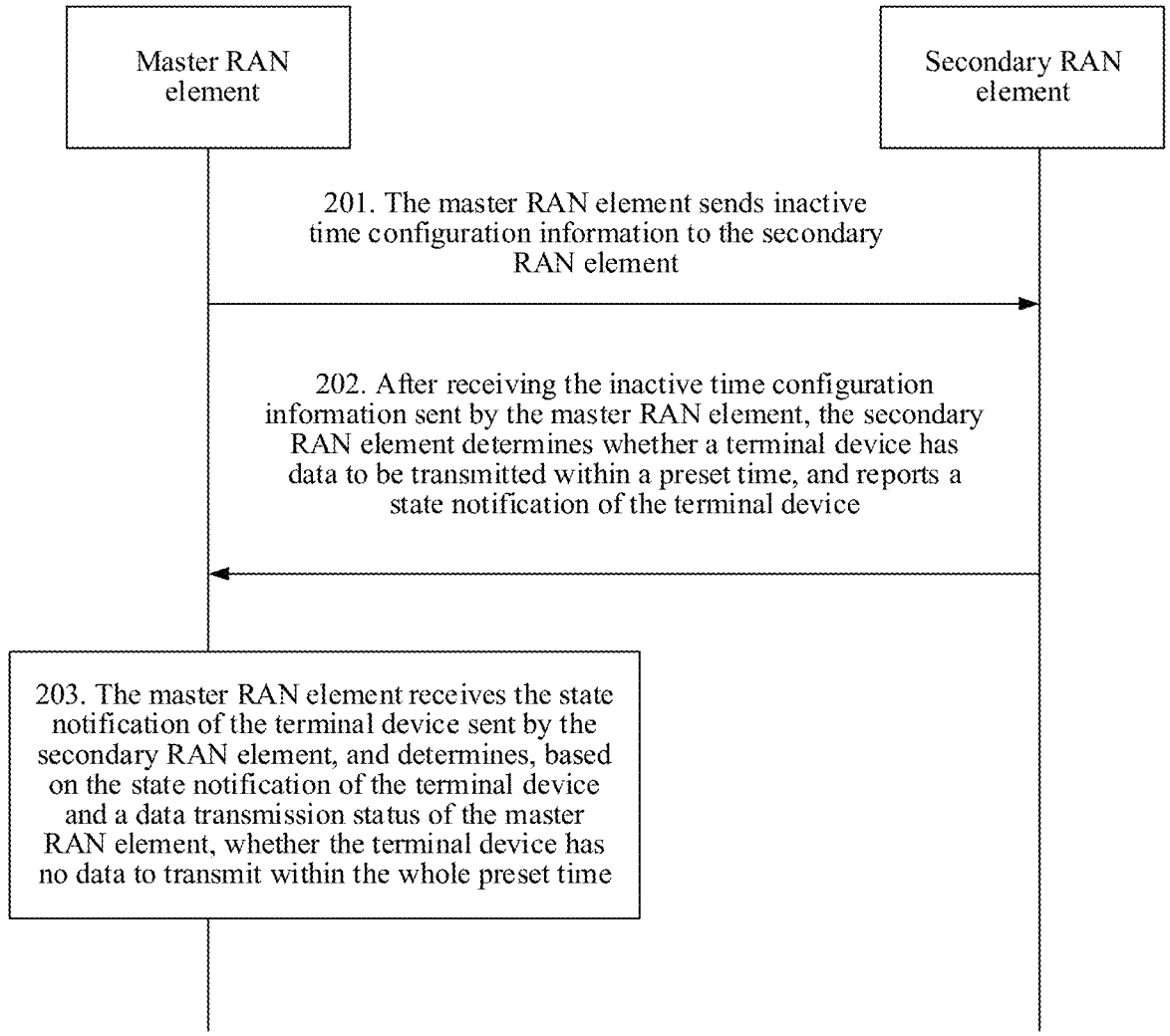
FIG. 4 is a schematic flowchart of another method for establishing a connection according to an embodiment of this application.

Case 2: Some data between the terminal device and the core network element does not pass through the master RAN element. For example, the bearers of the terminal device include a secondary cell bearer or a secondary cell split bearer. Therefore, the master RAN element cannot determine, based only on a data transmission status of the master RAN element, whether the terminal device has no data to transmit within the entire preset time, and the master RAN element further needs to refer to a data transmission status of the secondary RAN element. As shown in FIG. 4, the determination method includes the following steps.

201. The master RAN element sends inactive time configuration information to the secondary RAN element.

The inactive time configuration information is used to instruct the secondary RAN element to determine whether the terminal device has no data to transmit within the preset time period. Optionally, the inactive time configuration information includes the length of a specified time period, and/or a period of reporting an inactive state notification, and/or a quantity of times of reporting the inactive state notification.

202. After receiving the inactive time configuration information sent by the master RAN element, the secondary RAN element determines whether the terminal device has data to be transmitted within the preset time, and reports a state notification of the terminal device.

The state notification of the terminal device includes at least one of an active state notification and an inactive state notification.

Specifically, if the secondary RAN element determines that the terminal device has no data to transmit within the preset time, the secondary RAN element reports the inactive state notification of the terminal device to the master RAN element; or if the secondary RAN element determines that the terminal device has data to transmit within the preset time, the secondary RAN element reports the active state notification to the master RAN element.

It should be noted that, when the secondary RAN element reports the inactive state notification to the master RAN element, if the secondary RAN element has transmitted data to the terminal device before the secondary RAN element receives a suspension indication or a release indication from the master RAN element, the secondary RAN element needs to send the active state notification to the master RAN element.

Optionally, to enable the master RAN element to learn of a latest state notification of the terminal device in time, a preset reporting period may be configured. After reporting the inactive state notification to the master RAN element, the secondary RAN element may start a timer, and timing duration is the preset reporting period, so that the secondary RAN element periodically reports a state notification of the terminal device to the master RAN element.

Optionally, considering that the terminal device may have no data to transmit for a long time, to avoid wasting network resources caused by continuously reporting of the inactive state notification of the terminal device by the secondary RAN element, a threshold of the quantity of times of reporting the inactive state notification may be further configured in this embodiment of this application. To be specific, when the quantity of times of reporting the inactive state notification by the secondary RAN element reaches the threshold of the quantity of times of reporting, the inactive state notification does not need to be continuously reported.

Optionally, the secondary RAN element may actively report the inactive state notification to the master RAN element. For example, a time threshold of an inactive state is set, and when the secondary RAN element determines that the inactive time of the terminal device reaches the time threshold, the secondary RAN element reports the inactive state notification of the terminal device to the master RAN element.

203. The master RAN element receives the state notification of the terminal device sent by the secondary RAN element, and determines, based on the state notification of the terminal device and the data transmission status of the master RAN element, whether the terminal device has no data to transmit within the preset time.

Specifically, if the master RAN element receives the active state notification of the terminal device sent by the secondary RAN element, the master RAN element may determine that the terminal device has data to transmit within the preset time and determine to maintain the connected state of the terminal device.

Alternatively, if the master RAN element receives the inactive state notification of the terminal device that is sent by the secondary RAN element, the master RAN element needs to further perform determination based on the data transmission status of the master RAN element. Specifically, if the master RAN element transmits the data of the terminal device within the preset time, the master RAN element determines that the terminal device has data to transmit within the preset time and determines to maintain the connected state of the terminal device. If the master RAN element does not transmit the data of the terminal device within the preset time, the master RAN element determines that the terminal device has no data to transmit within the preset time and instruct the terminal device to enter the inactive state from the connected state.

Figure 5:
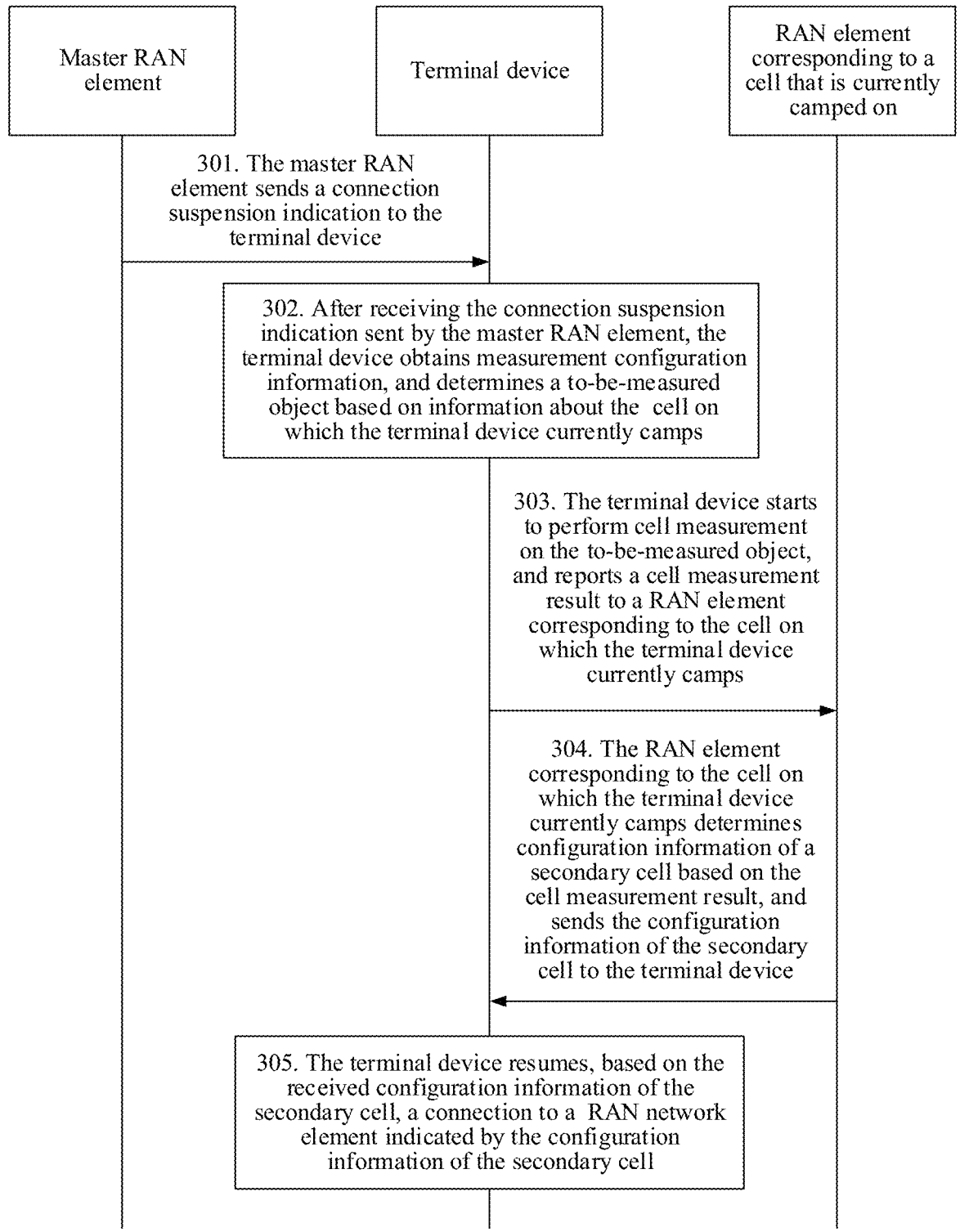
FIG. 5 is a schematic flowchart of another method for establishing a connection according to an embodiment of this application.

An embodiment of this application further provides a method for establishing a connection. As shown in FIG. 5, the method includes the following steps.

301. A master RAN element sends a connection suspension indication to a terminal device.

The connection suspension indication is used to instruct the terminal device to enter an inactive state from a connected state. The connection suspension indication for example, may be a connection suspension request message, a connection release request, or a connection inactivation request.

Optionally, the master RAN element may further configure measurement control information, namely, measurement configuration information, for the terminal device. The measurement configuration information includes a measurement object, and may be used by the terminal device to perform cell measurement in a subsequent connection resumption process. The measurement configuration information may further include information about the cell that is camped on, information about the measurement object or target, and a mapping relationship between the cell that is camped on and the measurement object, as shown in the following table. For example, if the cell that is camped on is a cell 1, a measurement object corresponding to the cell that is camped on is a frequency F1. If the cell that is camped on is a cell 5, a measurement object corresponding to the cell that is camped on is a frequency F3 or the cell 1, and so on.

TABLE 1

Table of a mapping relationship between a cell that is camped on and a measurement object

| Cell that is camped on | Measurement object |
|---|---|
| Cell 1 | Frequency F1 |
| Cells 2, 3, and 4 | Frequency F2 |
| Cell 5 | Frequency F3 or cell 1 |
| Cell 6 | N/A |

Optionally, the measurement configuration information may further include a measurement identifier. The measurement identifier may be used to identify a cell measurement result that is subsequently reported by the terminal device and that corresponds to the measurement configuration information.

302. After receiving the connection suspension indication sent by the master RAN element, the terminal device obtains the measurement configuration information, and determines a to-be-measured object based on information about the cell on which the terminal device currently camps.

Specifically, if the master RAN element sends the measurement configuration information to the terminal device, the terminal device determines the to-be-measured object based on the cell that is camped on. If the measurement configuration information includes an identifier of the measurement object, it may use the identifier to determine the to-be-measured object. If the measurement information includes the mapping relationship between the cell that is camped on and the measurement object, the to-be-measured object is determined based on the cell on which the terminal device currently camps. For example, as shown in the foregoing table, if the cell on which the terminal device currently camps is the cell 1, it may be determined that the frequency F1 is the to-be-measured object. The measurement object is a candidate secondary cell configured with carrier aggregation or a multi-connectivity candidate secondary cell, or a frequency at which the candidate secondary cell is located.

Optionally, the terminal device may further obtain the to-be-measured object from the system message of the cell that is currently camped on. The system message of the cell that is currently camped on includes the measurement configuration information, the measurement configuration information includes the measurement object, and the terminal device determines that the measurement object is the to-be-measured object.

Optionally, the measurement object may further include indication information used to instruct the terminal device in the inactive state to perform measurement.

303. The terminal device starts to perform cell measurement on the to-be-measured object, and reports a cell measurement result to a RAN element corresponding to the cell on which the terminal device currently camps.

The RAN network corresponding to the cell on which the terminal device currently camps and a master RAN element of the terminal device in the connected state may be the same RAN element or different RAN elements.

Optionally, the terminal device may start cell measurement on the to-be-measured object after determining what the to-be-measured object is. Optionally, the terminal device may start cell measurement on the to-be-measured object when determining that there is data that needs to be transmitted. Optionally, after receiving paging, the terminal device may start cell measurement on the to-be-measured object. Optionally, the terminal device may start cell measurement before, when, or after determining to send connection resumption request information to the RAN element corresponding to the cell that is camped on. A specific time point at which the terminal device starts cell measurement is not limited in this embodiment of this application.

Correspondingly, the terminal device may add the cell measurement result to a message in which the connection resumption request information is located, or may separately send the cell measurement result. This is not limited in this embodiment of this application. Optionally, when the cell measurement result is reported, a measurement identifier may be further carried in the cell measurement result, so that the RAN element determines, based on the measurement identifier, the measurement result corresponding to the measurement configuration information.

304. The RAN element corresponding to the cell on which the terminal device currently camps determines configuration information of a secondary cell based on the cell measurement result, and sends the configuration information of the secondary cell to the terminal device.

305. The terminal device resumes, based on the received configuration information of the secondary cell, a connection to the RAN element indicated by the configuration information of the secondary cell.

In the method for establishing a connection provided in this embodiment of this application, the terminal device in the inactive state can determine the to-be-measured object based on the cell that is currently camped on, and perform cell measurement on the to-be-measured object in advance. Then, the RAN element corresponding to the cell that is currently camped on can determine the configuration information of the secondary cell for the terminal device based on the cell measurement result. In this way, acceleration of the process of resuming the connection by the terminal device and improvement of network transmission efficiency are facilitated.

The foregoing mainly describes the solutions provided in the embodiments of this application from a perspective of interaction between network elements. It can be understood that, to implement the foregoing functions, the network elements, for example, the terminal device and the RAN element, include corresponding hardware structures and/or software modules for performing the functions.

In the embodiments of this application, the terminal device, the RAN element, or the like may be divided into functional modules according to the foregoing method example. For example, functional modules corresponding to functions may be obtained through division, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 6:
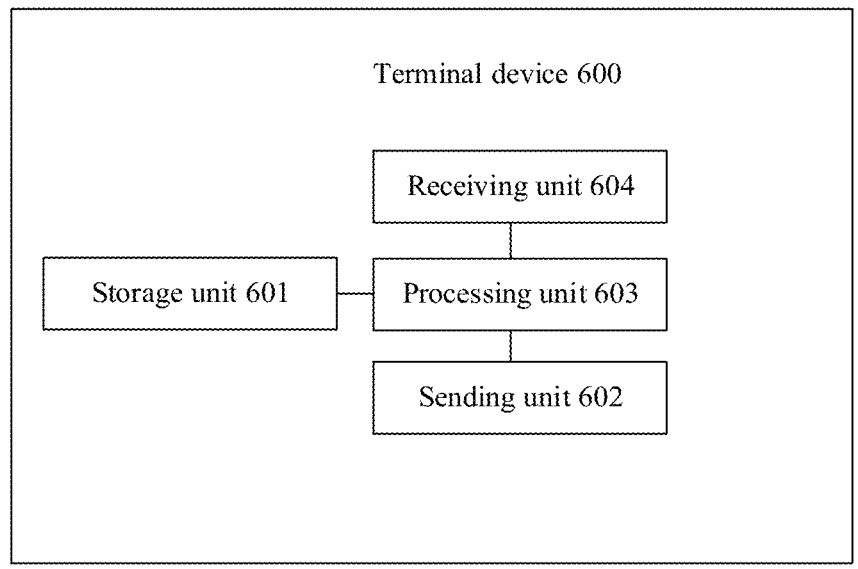
FIG. 6 is a schematic structural diagram of another terminal device according to an embodiment of this application.

When the functional modules are obtained through division based on the corresponding functions, FIG. 6 shows a possible schematic structural diagram of the terminal device in the foregoing embodiment. The terminal device 600 includes a storage unit 601, a sending unit 602, a processing unit 603, and a receiving unit 604. The storage unit 601 is configured to support the terminal device in performing the process 103 in FIG. 3A. The sending unit 602 is configured to support the terminal device in performing the processes 102 and 104 in FIG. 3A, and the processes 108, 109, and 110 and FIG. 3B. The processing unit 603 is configured to support the terminal device in performing the process 107 in FIG. 3B. The receiving unit 604 is configured to support the terminal device in performing the process 106 in FIG. 3B. The processing unit is further configured to support the terminal device in performing cell measurement on a secondary cell used by the terminal device in a connected state, and so on.

Further, the processing unit 603 is further configured to support the terminal device in performing the processes 302, 304, and 305 in FIG. 5. The processing unit 603 is further configured to support the terminal device in performing the process 103 in FIG. 3A. The sending unit 602 and the receiving unit 604 are further configured to support communication between the terminal device and another network element. The storage unit 601 is further configured to store program code and data of the terminal device.

All related content of the steps in the foregoing method embodiments may be cited in function descriptions of corresponding functional modules, and details are not described herein again.

The terminal device 600 may be the mobile phone 200 shown in FIG. 2. Specifically, the storage unit 601 may be the memory 230 shown in FIG. 2. The sending unit 602 and the receiving unit 604 may be integrated together, and may be the RF circuit 220 shown in FIG. 2. The processing unit 603 and the processing unit 605 may be integrated together. For example, the processor 280 shown in FIG. 2 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

Figure 7:
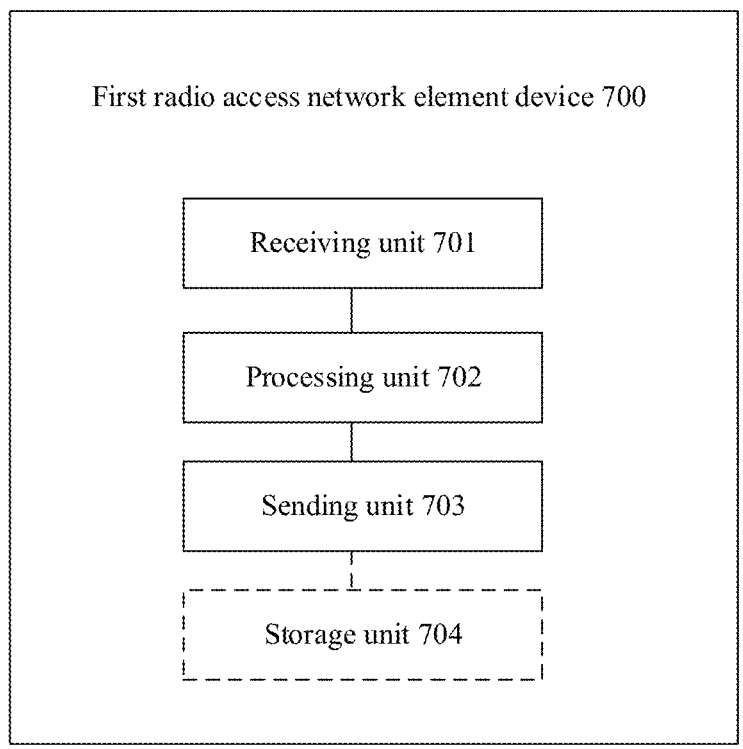
FIG. 7 is a schematic structural diagram of a radio access network element device according to an embodiment of this application.

When the functional modules are obtained through division based on the corresponding functions, FIG. 7 is a possible schematic structural diagram of the first RAN element device in the foregoing embodiment. The first RAN element device 700 includes a receiving unit 701, a processing unit 702, and a sending unit 703. The receiving unit 701 is configured to support the first RAN element in performing the process in FIG. 3A and FIG. 3B. The processing unit 702 is configured to support the first RAN element in performing the process 101 in FIG. 3A. The sending unit 703 is configured to support the first RAN element in performing the processes 102 and 105 in FIG. 3A, and the processes 201 and 203 in FIG. 4. The receiving unit 701 is configured to receive messages and data that are sent by a terminal device and a second RAN element. The first RAN element device may further include a storage unit 704, configured to store program code and data of the terminal device.

Further, the sending unit 703 is further configured to support the first RAN element in performing the process 301 in FIG. 5. The receiving unit 701 is further configured to support the first RAN element in receiving a cell measurement result for a to-be-measured object that is sent by the terminal device, and so on.

All related content of the steps in the foregoing method embodiments may be cited in function descriptions of corresponding functional modules, and details are not described herein again.

The storage unit 704 may be a memory. The processing unit 702 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The receiving unit 701 and the sending unit 703 may be integrated together, and may be a transceiver, a transceiver circuit, a communications interface, or the like.

Figure 8:
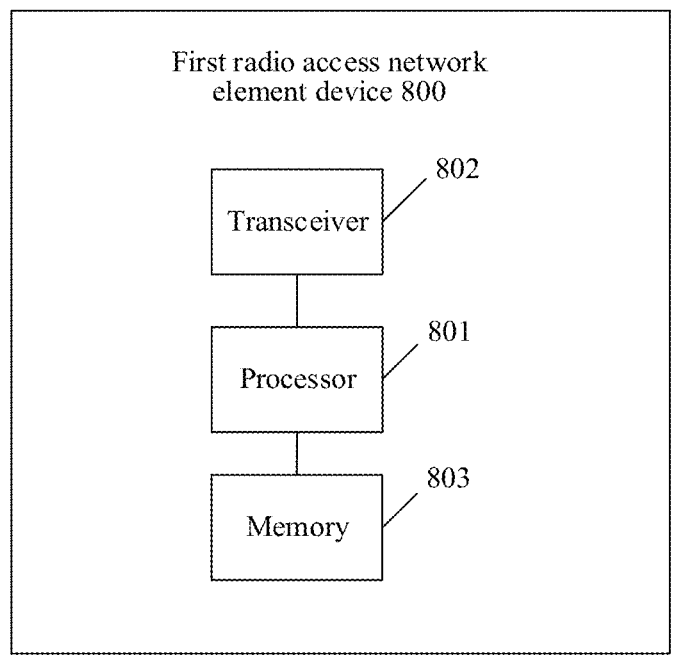
FIG. 8 is a schematic structural diagram of another radio access network element device according to an embodiment of this application.

When the storage unit 704 is a memory, the processing unit 702 is a processor, and the receiving unit 701 and the sending unit 703 may be integrated together to serve as a transceiver, the base station in the embodiments of this application may be the first RAN element device shown in FIG. 8.

As shown in FIG. 8, the first RAN element device 800 includes a processor 801, a transceiver 802, and a memory 803. The transceiver 802, the processor 801, and the memory 803 are connected to each other.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of this application are further described in detail in the foregoing specific embodiments. It should be understood that the foregoing descriptions are merely specific embodiments of this application, but are not intended to limit the protection scope of this application. Any modification, equivalent replacement or improvement made based on the technical solutions of this application shall fall within the protection scope of this application.

What is claimed is:

1. A method for establishing a connection implemented on a terminal device, comprising:
sending connection resumption request information to a first radio access network (RAN) element, wherein the first RAN element is a RAN element corresponding to a cell on which the terminal device currently camps, the first RAN element is a RAN element indicated by configuration information of a master cell used by the terminal device in a connected state, the terminal device is in an inactive state, the terminal device stores configuration information, and the configuration information comprises information about a secondary cell corresponding to the terminal device in the connected state;
receiving acknowledgement information from the first RAN element in response to the connection resumption request information;
based on the acknowledgement information comprising information for indicating to the terminal device to maintain configuration information of the secondary cell, maintaining the configuration information and determining to resume a connection to a second RAN element, wherein the second RAN element is indicated by the configuration information of the secondary cell; and
resuming the connection to the second RAN element.

2. The method according to claim 1, further comprising:
receiving, an instruction from the first RAN element, wherein the instruction instructs the terminal device whether to enter an inactive state based on a state notification and a data transmission status of the first RAN element, wherein the state notification includes an active state notification or an inactive state notification.

3. The method according to claim 1, wherein
the determining to resume a connection to a second RAN element comprises:
determining to resume a connection to the second RAN element based on a measurement result of the secondary cell.

4. The method according to claim 3, wherein the determining to resume a connection to the second RAN element based on a measurement result of the secondary cell comprises:
determining to resume the connection to the second RAN element based on the configuration information of the secondary cell if the terminal device determines that the secondary cell is available based on the measurement result of the secondary cell.

5. The method according to claim 4, wherein the determining that the secondary cell is available based on the measurement result of the secondary cell comprises:
determining that the secondary cell is available if the secondary cell is detected and a signal measurement value of the secondary cell is greater than or equal to a threshold.

6. A terminal device for establishing a connection, comprising:
a transmitter, configured to send connection resumption request information to a first radio access network (RAN) element, wherein the first RAN element is a RAN element corresponding to a cell on which the terminal device currently camps, the first RAN element is a RAN element indicated by configuration information of a master cell corresponding to the terminal device in a connected state, the terminal device is in an inactive state, the terminal device stores configuration information by using a storage unit, and the configuration information comprises information about a secondary cell corresponding to the terminal device in the connected state;
a receiver, configured to receive acknowledgement information from the first RAN element, wherein the acknowledgement information is in response to the connection resumption request information; and
a processor, configured to determine to resume a connection to a second RAN element based on the acknowledgement information comprising information for indicating to the terminal device to maintain configuration information of the secondary cell, wherein the second RAN element is indicated by the configuration information of the secondary cell, and configured to resume the connection to the second RAN element.

7. The terminal device according to claim 6, wherein the receiver is further configured to receive an instruction from the first RAN element, wherein the instruction instructs the terminal device whether to enter an inactive state based on a state notification and a data transmission status of the first RAN element, wherein the state notification includes an active state notification or an inactive state notification.

8. The terminal device according to claim 6, wherein the determining to resume a connection to a second RAN element comprises:
determining to resume a connection to the second RAN element based on a measurement result of the secondary cell.

9. The terminal device according to claim 8, wherein the determining to resume a connection to the second RAN element based on a measurement result of the secondary cell comprises: determining to resume the connection to the second RAN element based on the configuration information of the secondary cell if the secondary cell is determined to be available based on the measurement result of the secondary cell.

10. The terminal device according to claim 9, wherein the secondary cell is determined to be available if the secondary cell is detected and a signal measurement value of the secondary cells is greater than or equal to a threshold.

11. A first radio access network (RAN) element device for establishing a connection, comprising:
   a receiver, configured to receive connection resumption request information from a terminal device, wherein the connection resumption request information comprises an identifier of the terminal device;
   a processor, configured to obtain, based on the identifier of the terminal device in the connection resumption request information received by the receiver, configuration information of a secondary cell corresponding to the terminal device in a connected state; and
   a transmitter, configured to send acknowledgement information to the terminal device in response to the connection resumption request information and to indicate to the terminal device to resume a connection to a second RAN element according to the acknowledgement information, wherein the acknowledgement information comprises information for indicating to the terminal device to maintain configuration information of the secondary cell and the second RAN element is a RAN element indicated by the configuration information of the secondary cell.

12. The first RAN element device according to claim 11, wherein the transmitter is further configured to send an instruction based on a state notification and a data transmission status of the first RAN element, wherein the state notification includes an active state notification or an inactive state notification.

13. The first RAN element device according to claim 11, wherein the processor is further configured to: if the first RAN element determines that the terminal device has no data to transmit within a preset time period, instruct the terminal device to enter an inactive state.

14. The first RAN element device according to claim 13, wherein the transmitter is further configured to send inactive time configuration information to the second RAN element, wherein the inactive time configuration information is used to instruct the second RAN element to report a state notification of the terminal device within the preset time period, the state notification of the terminal device is used to notify the first RAN element of a data transmission status of the terminal device within the preset time period, and the state notification of the terminal device comprises at least one of an active state notification and an inactive state notification; and
   the processor is further configured to determine, based on the state notification of the terminal device reported by the second RAN element, that the terminal device has no data to transmit within the preset time period.

* * * * *

UNITED STATES PATENT AND TRADEMARK OFFICE
CERTIFICATE OF CORRECTION

PATENT NO. : 11,464,063 B2
APPLICATION NO. : 16/734923
DATED : October 4, 2022
INVENTOR(S) : Bingzhao Li et al.

Page 1 of 1

It is certified that error appears in the above-identified patent and that said Letters Patent is hereby corrected as shown below:

In the Claims

In Column 31, Line 12, in Claim 10, delete "cells" and insert -- cell --.

Signed and Sealed this
Sixth Day of December, 2022

Katherine Kelly Vidal
*Director of the United States Patent and Trademark Office*